US006535133B2

(12) United States Patent
Gohara (10) Patent No.: US 6,535,133 B2
(45) Date of Patent: Mar. 18, 2003

(54) VEHICLE SLIDE DOOR POWER SUPPLY APPARATUS AND METHOD OF SUPPLYING POWER TO VEHICLE SLIDE DOOR

(75) Inventor: Takashi Gohara, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/987,670

(22) Filed: Nov. 15, 2001

(65) Prior Publication Data
US 2002/0056233 A1 May 16, 2002

(30) Foreign Application Priority Data
Nov. 16, 2000 (JP) ........................................ 2000-349463

(51) Int. Cl.$^7$ .............................................. G08B 17/00
(52) U.S. Cl. ................. 340/584; 340/545.1; 340/693.1; 340/636; 340/825.69; 340/825.72; 320/108; 320/109; 320/150
(58) Field of Search ............................. 340/584, 545.1, 340/546, 693.1, 636, 455, 825.69, 825.72, 870.31; 49/360, 421, 352; 320/108, 109, 150

(56) References Cited

U.S. PATENT DOCUMENTS

| 4,983,963 A | * | 1/1991 | Hodgetts et al. | ....... 340/870.31 |
| 5,140,316 A | * | 8/1992 | DeLand et al. | ........ 340/825.69 |
| 6,075,460 A | * | 6/2000 | Minissale et al. | ...... 340/825.69 |
| 6,108,976 A | * | 8/2000 | Kato et al. | .................... 49/360 |

FOREIGN PATENT DOCUMENTS

| JP | 090266643 A | 10/1997 | |
| JP | 10-278588 | 10/1998 | .............. B60J/5/60 |
| JP | 2000092729 A | 3/2000 | |
| JP | 2000255340 A | 9/2000 | |
| JP | 2001152745 A | 6/2001 | |
| JP | 2001210535 A | 8/2001 | |
| WO | WO 01/25056 A1 | 4/2001 | |

OTHER PUBLICATIONS

Japanese Abstract, 10–278588, Oct. 20, 1998.

* cited by examiner

Primary Examiner—Daniel J. Wu
Assistant Examiner—Hung Nguyen
(74) Attorney, Agent, or Firm—Sughrue Mion, PLLC (57) ABSTRACT

A vehicle slide door power supply apparatus includes a vehicle body-side primary coil (1) and a slide door-side secondary coil (2), which are brought into proximity to each other upon closing of a slide door to effect a mutual induction operation, thereby supplying electric power from a vehicle body to the slide door, a temperature sensor (3), provided in the vicinity of a proximity fitting surface of the primary coil (1) for the secondary coil (2), and a primary coil control device (4) which is connected to the temperature sensor (3), and can stop the excitation of the primary coil (1) in accordance with the temperature of the proximity fitting surface or the temperature of its vicinity, detected by the temperature sensor (3), so as to interrupt the supply of the electric power to the slide door.

4 Claims, 6 Drawing Sheets

PRIOR ART

PRIOR ART

VEHICLE SLIDE DOOR POWER SUPPLY APPARATUS AND METHOD OF SUPPLYING POWER TO VEHICLE SLIDE DOOR

BACKGROUND OF THE INVENTION

This invention relates to apparatus for supplying electric power from a vehicle body of a vehicle to a slide door, by utilizing a mutual induction operation of a primary coil and a secondary coil, and the invention also relates to a method of supplying electric power to the vehicle slide door.

In recent years, automobiles, having a slide door slidably mounted on a vehicle body, have had a high-function design. With this high-function design, for example, a power window has been mounted on the slide door, and it has become necessary to supply electric power to the slide door so as to drive the power window. Therefore, in recent years, there have been proposed various vehicle slide door power supply apparatuses for supplying electric power from a vehicle body of a vehicle to a slide door. One example of such vehicle slide door power supply apparatuses will be described briefly.

Figure 7:
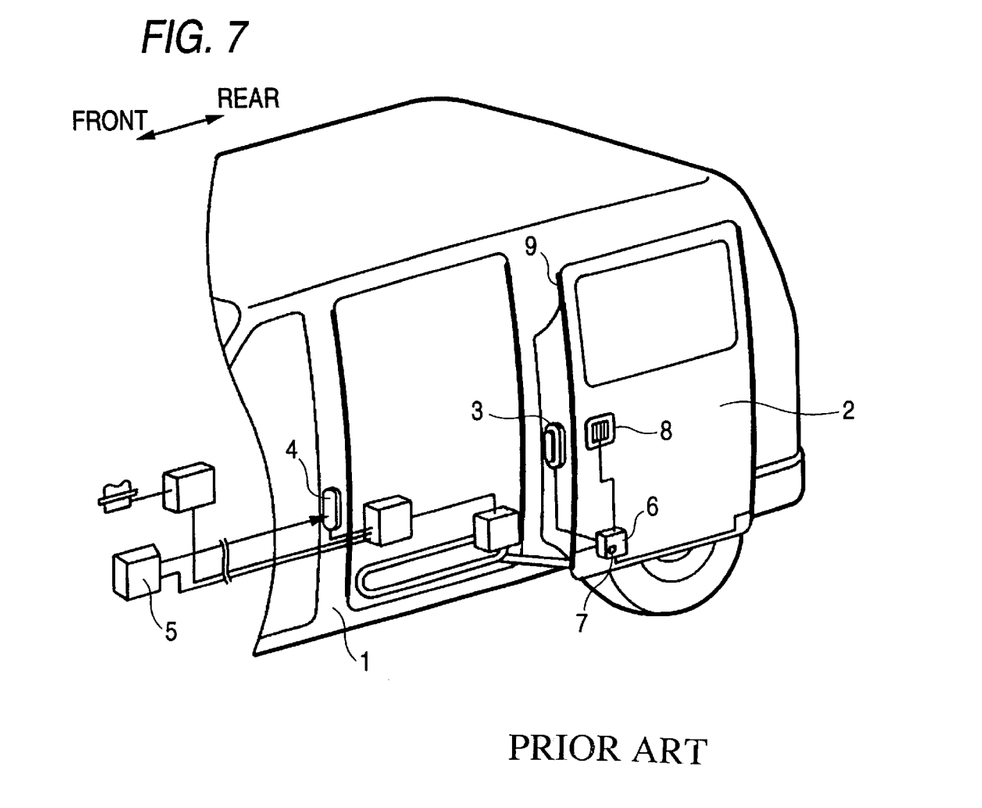
FIG. 7 is a schematic view showing a related vehicle slide door power supply apparatus.

In FIG. 7, a body-side feed contact 4 is mounted on a vehicle body 1. When a slide door 2 is closed, the feed contact 4 is brought in to contact to a door-side feed contact 3, mounted on the slide door 2, for an electrical connection. The body-side feed contact 4 is connected to a battery 5 mounted on the vehicle body 1. A door-inside controller 6 is mounted in the slide door 2. The door-inside controller 6 includes a door battery 7 which is chargeable, and the door-side feed contact 3 is connected to this door battery 7. When the slide door 2 is opened so that the door-side feed contact 3 is out of contact with the body-side feed contact 4, the door battery 7 supplies electric power to a pressure sensor 8 and a pressure-sensitive switch 9 which are mounted on the slide door 2.

Figure 8A:
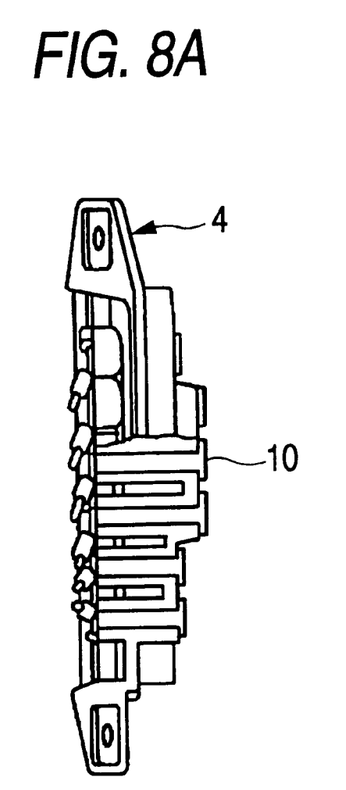
FIG. 8A is a schematic view showing a body-side feed contact.
Figure 8B:
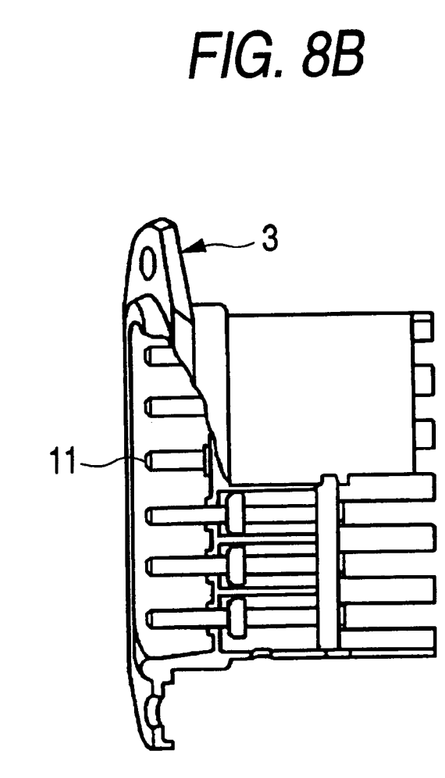
FIG. 8B is a schematic view showing a door-side feed contact.

FIG. 8A is a schematic view of the body-side feed contact 4. FIG. 8B is a schematic view of the door-side feed contact 3. In FIG. 8A, reference number 10 denotes female terminals (female connector). In FIG. 8B, reference numeral 11 denotes male terminals (male connector) which are brought into contact with the female terminals 10 for the electrically connection thereto when the slide door 2 (see FIG. 7) is closed.

In the above art, electric power is supplied from the vehicle body 1 to the slide door 2 by the electrical connection between the door-side feed contact 3 and the body-side feed contact 4. However, for some reason, when water is applied to the connecting portions of the body-side feed contact 4 and the door-side feed contact 3, or an electrically-conductive material (e.g. a thin metal sheet) is held between the body-side feed contact 4 and the door-side feed contact 3, there is encountered a problem that the short-circuiting occurred (There is a fear for the production of fire or an electric shock accident, thus affecting the safety).

SUMMARY OF THE INVENTION

This invention has been made under the above circumstances, and an object of the invention is to provide a vehicle slide door power supply apparatus and a method of supplying electric power to the vehicle slide door, in which the safety can be enhanced.

In order to solve the aforesaid object, the invention is characterized by having the following arrangement. A power supply apparatus for supplying electric power from a vehicle body to a slide door slidable mounted on the vehicle body of a vehicle, the power supply apparatus includes:

a primary coil provided to the vehicle body;

a secondary coil provided to the slide door, wherein the primary and secondary coils can be brought into proximity to each other upon closing of the slide door to effect a mutual induction operation so as to supply the electric power;

a temperature sensor provided in a vicinity of the primary coil;

a primary coil control device which is connected to the temperature sensor, and stops excitation of the primary coil in accordance with the temperature of the primary coil or the vicinity of the primary coil detected by the temperature sensor, so as to interrupt a supply of the electric power to the slide door;

a slide door-contained battery for supplying electric power to a load drive driving and controlling at least one load on the slide door at least when the slide door is opened or when the supply of the electric power to the slide door is interrupted; and charging means for charging the slide door-contained battery with the electric power supplied to the slide door through the secondary coil.

The power supply apparatus further comprising an alarm unit for warning of abnormality of the power supply judged by the primary coil control device in accordance with the temperature detected by the temperature sensor.

A method of supplying electric power from a vehicle body to a slide door slidably mounted on the vehicle body of a vehicle, in which the electric power is supplied to the slide door by a mutual induction operation of a primary coil provided to the vehicle body and a secondary coil provided to the slide door when the slide door is closed, the method comprising the steps of:

comparing temperature of the primary coil or temperature of a vicinity of the primary coil detected by a temperature sensor with a threshold value, and stopping excitation of the primary coil when the detected temperature exceeds the threshold value, so that the supply of the electric power to the slide door is interrupted.

The method further comprising the step of warning abnormality of a power supply through an alarm unit when the temperature detected by the temperature sensor exceeds the threshold value.

DETAILED DESCRIPTION OF PREFERRED EMBODIMENTS

A preferred embodiment of the present invention will now be described with reference to the drawings.

Figure 2:
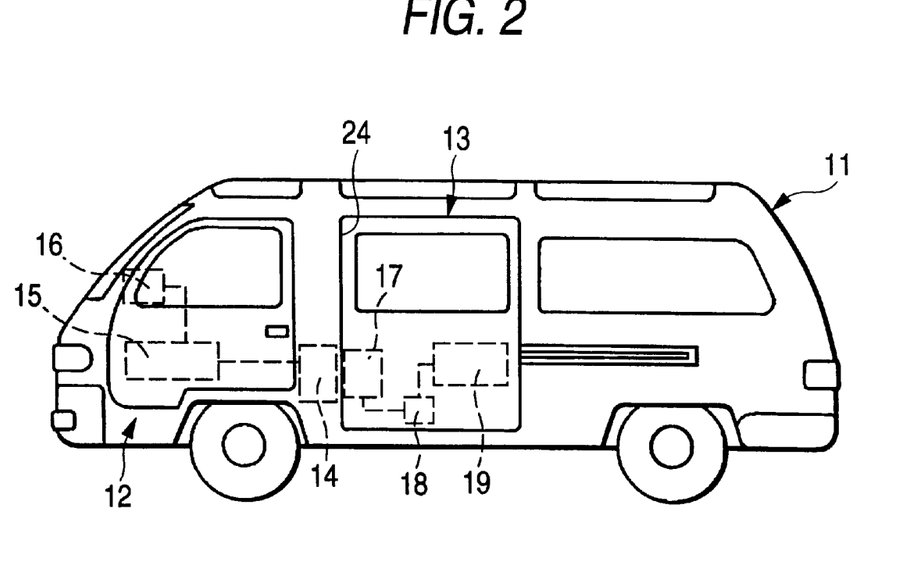
FIG. 2 is a construction view showing one preferred embodiment of a vehicle slide door power supply apparatus of the invention (in a closed conditions of a slide door).
Figure 3:
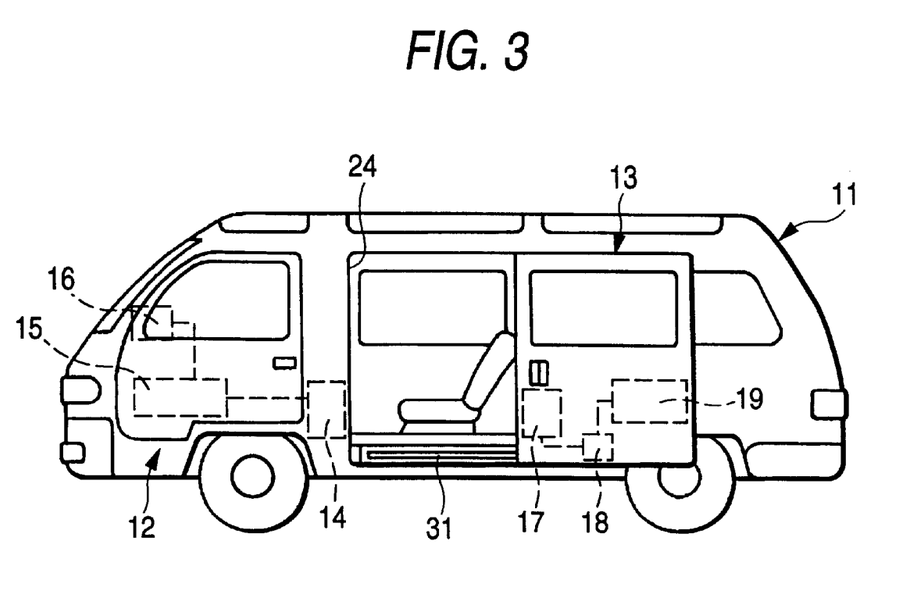
FIG. 3 is a construction view showing the preferred embodiment of the vehicle slide door power supply apparatus of the invention (in an condition of the slide door).
Figure 4:
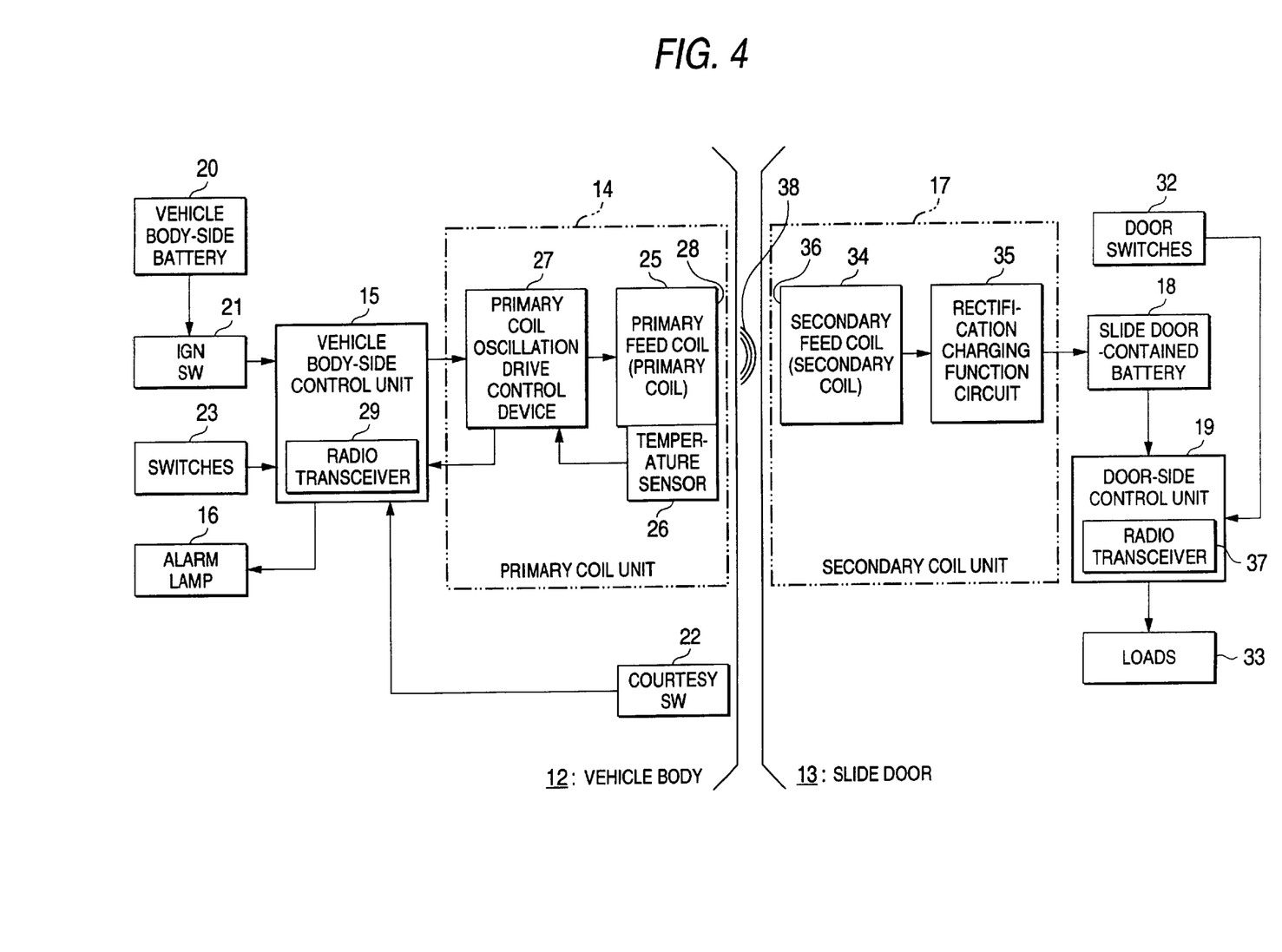
FIG. 4 is a block diagram of the preferred embodiment of the vehicle slide door power supply apparatus of the invention.
Figure 5:
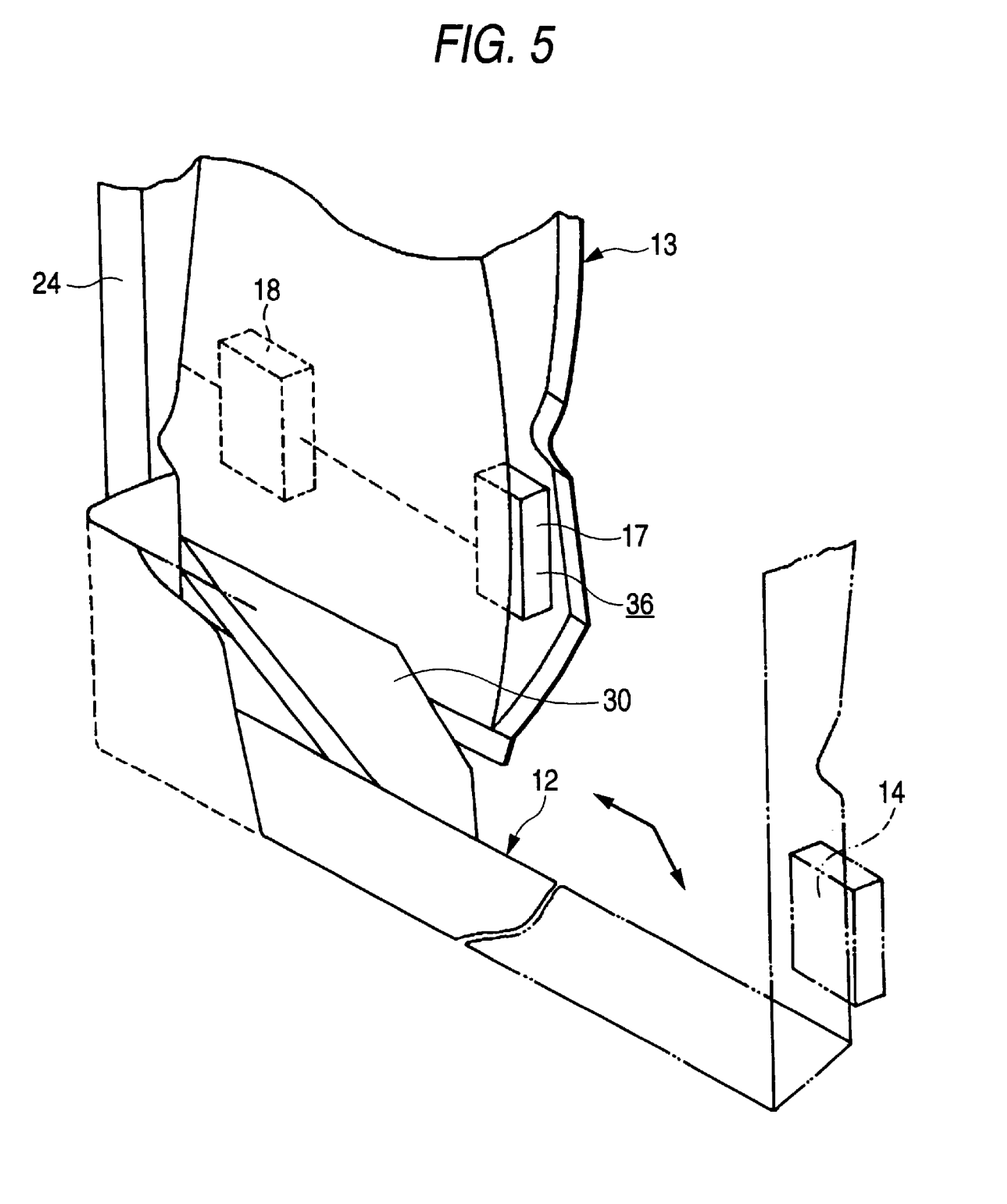
FIG. 5 is a perspective view explanatory of the arrangement of a primary coil unit and a secondary coil unit.

FIGS. 2 and 3 are construction views showing one preferred embodiment of a vehicle slide door power supply apparatus of the invention (in a closed condition of a slide door and in an open condition of the slide door). FIG. 4 is a block diagram for FIGS. 2 and 3, and FIG. 5 is a perspective view explanatory of the arrangement of a primary coil unit and a secondary coil unit.

In FIGS. 2 to 4, the vehicle slide door power supply apparatus according to the present invention is an apparatus for supplying electric power to the slide door 13 slidably mounted on a vehicle body 12 of a vehicle 11. This apparatus includes the primary coil unit 14 a vehicle body-side control unit 15, an alarm lamp 16 and so on, which are provided on the vehicle body 12, and further includes the secondary coil unit 17, a slide door-contained battery 18, a door-side control unit 19 and so on, which are provided on the slide door 13.

The constructions of the above elements will be described in detail with reference to FIGS. 2 to 4.

A vehicle body-side battery 20 of a known construction (serving as a power source), an ignition switch (IGN SW) 21 of a known construction, a courtesy switch (courtesy SW) 22 and switches 23 of a know construction are provided on the vehicle body 12. The vehicle body-side control unit 15 is connected to the vehicle body-side battery 20 so that this battery can supply electric power to this vehicle body-side control unit 15. The ignition switch 21 is provided midway in a power supply line electrically connecting the vehicle body-side battery 20 to the vehicle body-side control unit 15, and the supply of electric power to the vehicle body-side control unit 15 can be controlled by operating a switch (not shown). The courtesy switch 22 is provided in a predetermined position on an opening frame 24 for the slide door 13, and is operated when the slide door 13 is opened and closed. The courtesy switch 22 is connected to the vehicle body-side control unit 15. When the slide door 13 is opened, a courtesy lamp (not shown) is lighted. The vehicle body-side control unit 15 judges the (open/closed) state of the slide door 13 from the operating condition of the courtesy switch 22 so as to control the primary coil unit 14. The switches 23 include, for example, a centrallized door lock switch, a power window switch and so on.

The primary coil unit 14 comprises at least a primary, feed coil 25, a temperature sensor 26, and a primary coil oscillation drive control device 27. In this embodiment, the primary feed coil 25 corresponds to a primary coil, recited in the Claims, and to a primary coil 1 shown in FIG. 1. The temperature sensor 26 corresponds to a temperature sensor 3 shown in FIG. 1. The primary coil oscillation drive control device 27 corresponds to a primary coil control device, recited in the Claims, and to a primary coil control device 4 shown in FIG. 1.

The primary feed coil 25 has a known construction, and has a synthetic resin coating formed on its surface so that it can achieved a waterproof effect against water (such as water drops applied thereto from the exterior). A proximity fitting surface 28 of the primary feed coil 25 is exposed from the opening frame 24 (that is, exposed to that side wall of the opening frame 25 close to the front portion of the vehicle body 12; see FIG. 5) so that a secondary feed coil 34 (described later) can be disposed in close proximity to this fitting surface in opposed relation thereto (see FIG. 5).

The temperature sensor 26 comprises, for example, a thermistor serving as a sensor (It is not limited to this type, and any other sensor can be used in so far as it can detect the temperature). This sensor is provided in the vicinity of the proximity fitting surface 28, and is connected to the primary coil oscillation drive control device 27, and detects the temperature of the proximity fitting surface 28 or the temperature of its vicinity.

The primary coil oscillation drive control device 27 is designed to control the oscillation drive of the primary feed coil 25. In other words, this device has the function of an inverter and the function of switching the inverter, and is designed to control the excitation of the primary feed coil 25. The primary coil oscillation drive control device 27 has a microprocessor and so on (not shown), and in accordance with values of the temperature, detected by the temperature sensor 26 at suitable time intervals, this control device 27 judges whether or not any abnormality has developed in the primary feed coil 25 (and whether or not there is a fear of abnormality), and sends this judgment result to the vehicle body-side control unit 15. Depending on the information of the abnormal condition, this control device stops the excitation of the primary feed coil 25 which is being excited.

The vehicle body-side control unit 15 controls, for example, various equipments and so on provided on the vehicle body 12, and comprises a microprocessor (not shown) and peripheral circuits thereof. The vehicle body-side control unit 15 has a radio transceiver 29 formed integrally therewith (or separately therefrom). The alarm lamp 16 is connected to the vehicle body-side control unit 15.

The above microprocessor includes a ROM, a CPU, an EEPROM, RAM, input/output ports and so on. The ROM is a read-only memory, and stores a program, fixed data and the like. The CPU is a central processing unit which operates in accordance with a control program before and stored in the above ROM. The EEPROM is an electrically erasable/programmable read-only memory, and various set value information and the like are stored therein. The above RAM is a read/write memory, and has a data area for storing various data, used in the process of processing by the CPU, and a work area used in the processing.

The radio transceiver 29 is an equipment for transmitting and receiving control signals in a wireless manner relative to a radio transceiver 37 (described later) on the slide door 13. For example, when the driver operates a power window switch for a power window of the slide door 13, the radio transceiver 29 sends to the radio transceiver 37 the control signal to move a window pane of the slide door 13 upward or downward. In this embodiment, although the radio transceiver 29 transmits and receives the various control signals in a wireless manner, it may be so constructed as to transmit and receive these signals by wire or by electromagnetic induction (that is, by cables or by a mutual induction operation or the like). The control signals can be transmitted and received by communication using light, infrared rays or the like.

Figure 1:
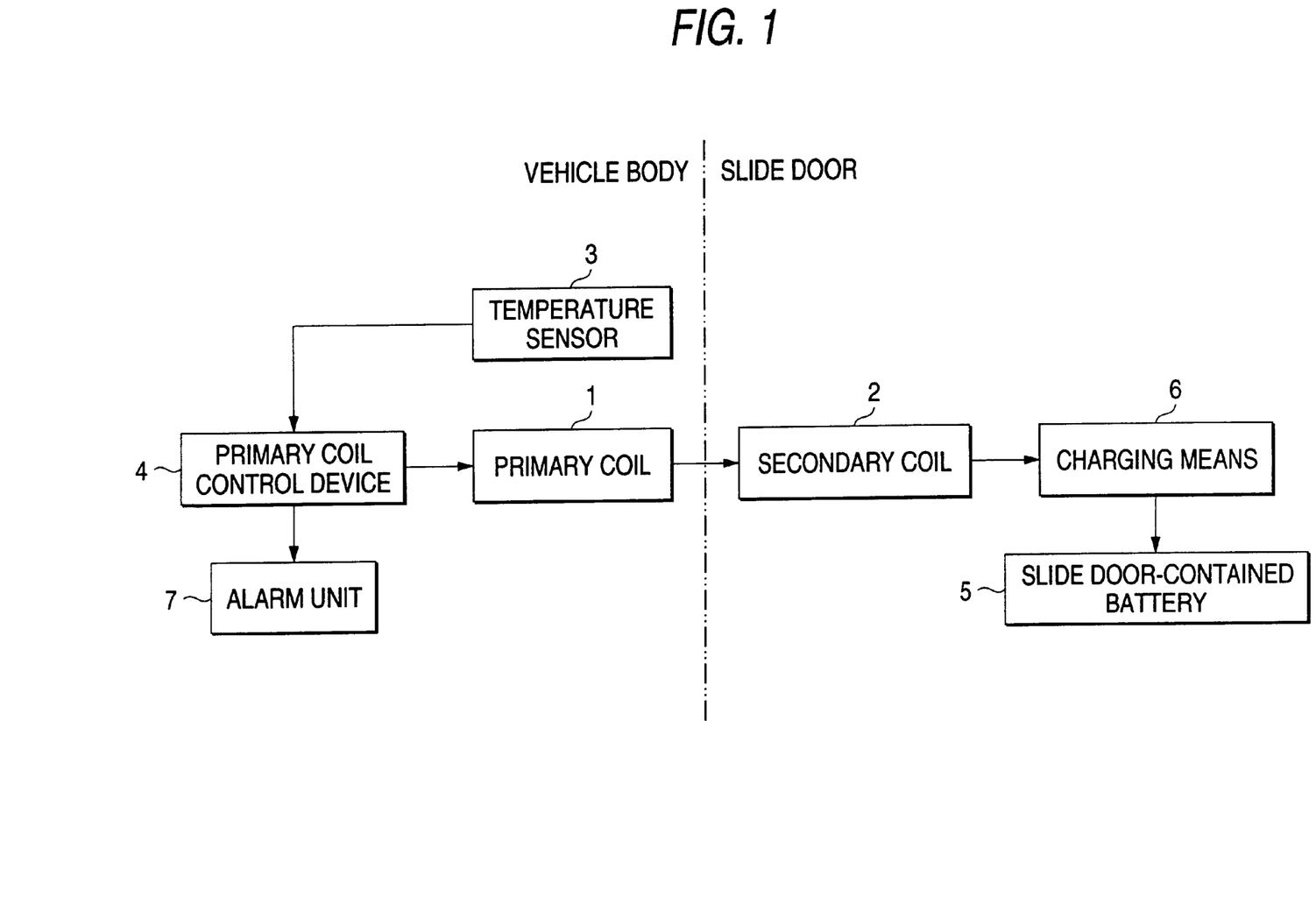
FIG. 1 is a view showing the basic construction of a vehicle slide door power supply apparatus of the present invention.

The alarm lamp 16 corresponds to an alarm unit recited in the Claims, and to an alarm unit 7 shown in FIG. 1. For example, this alarm lamp is mounted, together with various alarm lamps, on a meter unit provided in front of the driver's seat. When abnormality develops in the primary feed coil 15 (or there is a fear of abnormality), the alarm lamp 16 is lighted. In this embodiment, although the alarm lamp 16 draws the attention of the driver and other by lighting, it may be replaced by means for producing an alarm sound.

A door stay 30 (see FIG. 5) is provided on a lower portion of the slide door 13. The secondary coil unit 17, the slide door-contained battery 18 (corresponding to a slide door-contained battery 5 shown in FIG. 1) and the door-side control unit 19 are provided on the slide door 13 as described above, and in addition, door switches 32 and loads 33 are provided on this slide door.

The door stay 30 can be guided by a rail portion 31 provided at a lower portion of the opening frame 24 of the vehicle body 12. Namely, a roller (not shown) is provided at a distal end of the door stay 30, and this roller can roll along the rail portion 31. The door stay 30 is movable, together with the slide door 13, in the forward-rearward direction (see arrows in FIG. 5) of the vehicle body 12. In the case where the above-mentioned various control signals are transmitted and received by cables, the door stay 30 can be used as a bridge member for the cables.

The secondary coil unit 17 comprises at least the secondary feed coil 34, and a rectification charging function circuit 35. In this embodiment, the secondary feed coil 34 corresponds to a secondary coil, recited in the Claims, and to a secondary coil 2 shown in FIG. 1. The rectification charging function circuit 35 corresponds to charging means, recited in the Claims, and to charging means 6 shown in FIG. 1.

The secondary feed coil 34 has a known construction, and has a synthetic resin coating formed on its surface so that it can achieve a waterproof effect against water (such as water drops applied thereto from the exterior). A proximity fitting surface 36 of the secondary feed coil 34 is exposed from the opening frame 24 (that is, exposed to that side wall of the opening frame 24 close to the rear portion of the vehicle body 12; see FIG. 5) so that the proximity fitting surface 28 of the primary feed coil 25 can be disposed in close proximity to this fitting surface 36 in opposed relation thereto (see FIG. 5).

The rectification charging function circuit 35 comprises a rectifier circuit for rectifying a dielectric electromotive force produced in the secondary feed coil 34, and a charging circuit for charging the slide door-contained battery 18 with the dielectric electromotive force produced in the secondary feed coil 34.

The slide door-contained battery 18 is a power source of a known construction, and is connected to the door-side control unit 19 so that this battery can always supply electric power to the door-side control unit 19 (It can always supply electric power though depending on the capacity. In the case where the slide door-contained battery 18 does not supply electric power in the closed condition of the slide door 13, a dielectric electromotive force, which can drive the loads 33, need to be produced in the secondary coil unit 17, and therefore there is a fear that the secondary coil unit 17 becomes large in size.). The slide door-contained battery 18 does not need to have a large capacity as in the vehicle body-side battery 20, and has a compact size and a capacity which can drive the loads 33. The slide door-contained battery 18 is mounted on the slide door 13 in an exchangeable manner.

The door-side control unit 19 (corresponding to a load driver recited in the Claims) controls the driving of various loads 33 and so on provided on the slide door 13, and comprises a microprocessor (not shown) and peripheral circuits thereof. The door-side control unit 19 has the radio transceiver 37 formed integrally therewith (or separately therefrom). The radio transceiver 37 is an equipment for transmitting and receiving the control signals (for the loads 33 and so on) relative to the radio transceiver 29 mounted on the vehicle body 12. The door-side control unit 19 can monitor the charged condition (charging rate) of the slide door-contained battery 18. Although not particularly shown, the door-side control unit 19 has the function to switch a power supply line between the rectification charging function circuit 35 and the slide door-contained battery 18.

The door switches 32 include, for example, a door opening/closing handle switch and a power window switch.

The loads 33 include, for example, a power window and a door lock.

The primary coil unit 14 can be constructed as one module. Similarly, the secondary coil unit 17 can be constructed as one module (in which the door-side control unit 19 and so on may be included). With this construction, the efficiency of the assembling operation is enhanced. It will be appreciated from the above construction that there is no bridge member for cables (cables for feeding purposes and cables for the control signals) between the vehicle body 12 and the slide door 13. Therefore, the efficiency of the assembling operation is enhanced.

Next, the operation of the vehicle slide door power supply apparatus of the invention will be described on the basis of the above construction (One example. A power supply method is included).

When a key (not shown) for the vehicle 11 is withdrawn from the ignition switch 21, electric power is not supplied from the vehicle body-side battery 20 to the vehicle body-side control unit 15, and the supply of electric power to the slide door 13 is interrupted. Although electric power is supplied from the slide door-contained battery 18 to the door-side control unit 19, this control unit 19 will not operate before it receives the control signals from the vehicle body-side control unit 15. Therefore, even when the door switches 32 are operated, the door-side control unit 19 will not drive the loads 33.

When the key (not shown) is inserted into the ignition switch 21 and is operated, electric power is supplied from the vehicle body-side battery 20 to the vehicle body-side control unit 15. When electric power is supplied to the vehicle body-side control unit 15, this control unit 15 is driven and sends the control signals to the door-side control unit 19 via the radio transceivers 29 and 37, thereby turning the door-side control unit 19 into a stand-by condition. The vehicle body-side control unit 15 confirms the ON/OFF condition of the courtesy switch 22, and judges whether or not the slide door 13 is closed. If the slide door 33 is closed, this control unit drives the primary coil oscillation drive control device 27.

When the primary coil oscillation drive control device 27 is driven by the vehicle body-side control unit 15, the primary feed coil 25 is excited by the primary coil oscillation drive control device 27. When the primary feed coil 25 is excited, magnetic flux 38, produced by this execution, penetrates through the secondary feed coil 34, disposed in close proximity to the primary feed coil 25 in the closed condition of the slide door 13, so that the secondary feed coil 34 produces an electromotive force by a mutual induction operation. Then, the electromotive force, produced in the secondary feed coil 34, is transmitted to the slide door-contained battery 18 via the rectification charging function circuit 35, so that this battery is charged with this electromotive force. When the primary coil oscillation drive control device 27 is driven by the vehicle body-side control unit 15, this primary coil oscillation drive control device 27 detects the temperature of the proximity fitting surface 28 or the temperature of its vicinity by the temperature sensor 26, connected thereto, to check whether or not there is abnormality of the primary feed coil 25.

As described above, electric power is supplied from the vehicle body 12 to the slide door 13 by the mutual induction operation of the primary feed coil 25 and the secondary feed coil 34. Therefore, even when for example, the hand touches the proximity fitting surface 28 or other, there is no risk of an electric shock. And besides, even when water is applied to the proximity fitting surface 38 or other for some reason, short-circuiting as experienced in the related art will not occur because of the structure of the primary and secondary feed coils 25 and 34, and there is not risk of producing fire in the worst case.

Even is an electrically-conductive material (e.g. a thin metal sheet) should be held between the proximity fitting surfaces 28 and 36 when the slide door 13 is closed, short-circuiting will not occur, but an excess current loss develops between this material and the primary feed coil 25, so that the temperature of the above portion of the primary feed coil 25 abruptly rises. However, the primary coil oscillation drive control device 27 detects the temperature of the proximity fitting surface 28 of the temperature of its vicinity by the temperature sensor 26 to check whether or not there is abnormality. When this control device judges that there is abnormality, it stops the excitation of the primary feed coil 25 to interrupt the supply of electric power to the slide door 13. Therefore, even when for example, the hand touches the proximity fitting surface 28, there is no risk of suffering a burn.

Figure 6:
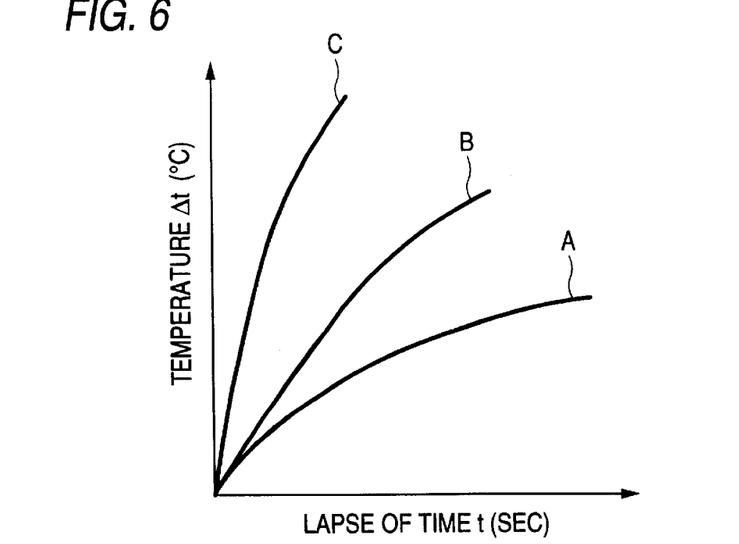
FIG. 6 is a graph showing the relation between the temperature detected by a temperature sensor, and the lapse of time.

Additional description will be given with reference to FIG. 6. The primary coil oscillation drive control device 27 compares the temperatures, detected by the temperature sensor 26, with a predetermined threshold value (not shown). When the temperature rise is below the threshold value (not shown) as indicated by reference character A, and therefore is normal, the supply of electric power to the slide door 13 is continued. When the temperature rise is above the threshold value (not shown), but is not abrupt as indicated by reference character B, the supply of electric power to the slide door 13 is continued while lighting the alarm lamp in order to warn the abnormality can occur before long. When the temperature rises abruptly above the threshold value (not shown) as indicated by reference character C, the excitation of the primary feed coil 25 is stopped, thereby interrupting the supply of electric power to the slide door 13 while lighting the alarm lamp 16 (which is different from the above alarm lamp 16) in order to warn that abnormality has occurred (Even when the supply of electric power to the slide door 13 is interrupted, there is not problem with the driving of the loads 33 since there is provided the slide door-contained battery 18).

From the foregoing, it will be understood that the power supply apparatus is designed not merely to supply electric power from the vehicle body 12 to the slide door 13 by the mutual induction operation of the primary feed coil 25 and the secondary feed coil 34. Various modifications can be made within the scope of the subject matter of the present invention.

From the above description, the present invention can be characterized, with reference to FIG. 1 showing the basic construction of a vehicle slide door power supply apparatus of the present invention, as follows:

A power supply apparatus for supplying electric power from a vehicle power to a slide door slidable mounted on the vehicle body of a vehicle, the power supply apparatus includes:

a primary coil 1 provided to the vehicle body;

a secondary coil 2 provided to the slide door, wherein the primary and secondary coils 1, 2 can be brought into proximity to each other upon closing of the slide door to effect a mutual induction operation so as to supply the electric power;

a temperature sensor 3 provided in a vicinity of the primary coil;

a primary coil control device 4 which is connected to the temperature sensor 3, and stops excitation of the primary coil 1 in accordance with the temperature of the primary coil or the vicinity of the primary coil detected by the temperature sensor 3, so as to interrupt a supply of the electric power to the slide door;

a slide door-contained battery 5 for supplying electric power to a load driver driving and controlling at least one load on the slide door at least when the slide door is opened or when the supply of the electric power to the slide door is interrupted; and charging means 5 for charging the slide door-contained battery with the electric power supplied to the slide door through the secondary coil.

The above power supply apparatus according may be further includes an alarm unit 7 for warning of abnormality of the power supply judged by the primary coil control device in accordance with the temperature detected by the temperature sensor.

In the invention as described above, the power is supplied from the vehicle body to the slide door by the mutual induction operation of the primary coil and the secondary coil 2. When it is judged on the basis of the temperature of the proximity fitting surface or its vicinity, detected by the temperature sensor, that abnormality has developed in the primary coil 1, the primary coil control device 4 stops the excitation of the primary coil 1 to interrupt the supply of the electric power to the slide door. At least when the slide door is opened or when the supply of the electric power to the slide door is interrupted, the slide door-contained battery 5 supplies electric power to the load drive means.

In the invention, there is further provided the alarm unit 7. Namely, the vehicle slide door power supply apparatus of the invention comprises the primary coil 1, the secondary coil 2, the temperature sensor 3, the primary coil control device 4, the slide door-contained battery 5, the charging means 6, and the alarm unit 7. The alarm means warns of abnormality of the power supply judged by the primary coil control device 4 in accordance with the temperature detected by the temperature sensor 3.

As described above, in the present invention, electric power is supplied from the vehicle body to the slide door by the mutual induction operation of the primary coil and the secondary coil. Therefore, even when for example, the hand touches the proximity fitting surface or other, there is no risk of an electric shock. And besides, even when water is applied to the proximity fitting surface or other for some reason, short-circuiting as experienced in the prior art will not occur, and there is not risk of producing fire in the worst case. On the other hand, when the primary coil control device judges on the basis of the temperature of the proximity fitting surface or the temperature of its vicinity, detected by the temperature sensor, that abnormality has developed in the primary coil, this control devices stops the excitation of the primary coil, thereby interrupting the supply of electric power to the slide door. Therefore, the primary coil will not be heated excessively, and even when for example, the hand touches the proximity fitting surface, there is no risk of suffering a burn. Therefore, there is achieved an advantage that there can be provided the vehicle slide door power supply apparatus in which the safety is enhanced. And besides, even when the slide door is opened, or when the supply of electric power to the slide door is interrupted, there is achieved an advantage that the loads on the slide door can be driven.

Further, there is achieved an advantage that abnormality of the power supply can be warned.

Further, electric power is supplied from the vehicle body to the slide door by the mutual induction operation of the primary coil and the secondary coil. Therefore, even when for example, the hand touches the proximity fitting surface or other, there is no risk of an electric shock. And besides, even when water is applied to the proximity fitting surface or other for some reason, short-circuiting as experienced in the prior art will not occur, and there is no risk of producing fire in the worst case. On the other hand, the temperature of the proximity fitting surface or the temperature of its vicinity, detected by the temperature sensor, is compared with the threshold value, and when it is judged that abnormality has developed in the primary coil, the excitation of the primary coil is stopped, thereby interrupting the supply of the electric power to the slide door. Therefore, the primary coil will not be heated excessively, and even when for example, the hand touches the proximity fitting surface, there is not risk of suffering a burn. Therefore, there is achieved an advantage that there can be provided the vehicle slide door power supply method in which the safety is enhanced.

What is claimed is:

1. A power supply apparatus for supplying electric power from a vehicle body to a slide door slidable mounted on the vehicle body of a vehicle, the power supply apparatus comprising:

a primary coil provided to the vehicle body;

a secondary coil provided to the slide door, wherein the primary and secondary coils can be brought into proximity to each other upon closing of the slide door to effect a mutual induction operation so as to supply the electric power;

a temperature sensor provided in a vicinity of the primary coil;

a primary coil control device which is connected to the temperature sensor, and stops excitation of the primary coil in accordance with the temperature of the primary coil or the vicinity of the primary coil detected by the temperature sensor, so as to interrupt a supply of the electric power to the slide door;

a slide door-contained battery for supplying electric power to a load driver driving and controlling at least one load on the slide door at least when the slide door is opened or when the supply of the electric power to the slide door is interrupted; and charging means for charging the slide door-contained battery with the electric power supplied to the slide door through the secondary coil.

2. The power supply apparatus according to claim 1 further comprising an alarm unit for warning of abnormality of the power supply judged by the primary coil control device in accordance with the temperature detected by the temperature sensor.

3. A method of supplying electric power from a vehicle body to a slide door slidably mounted on the vehicle body of a vehicle, in which the electric power is supplied to the slide door by a mutual induction operation of a primary coil provided to the vehicle body and a secondary coil provided to the slide door when the slide door is closed, the method comprising the steps of:

comparing temperature of the primary coil or temperature of a vicinity of the primary coil detected by a temperature sensor with a threshold value, and stopping excitation of the primary coil when the detected temperature exceeds the threshold value, so that the supply of the electric power to the slide door is interrupted.

4. The method according to claim 3, further comprising the step of warning abnormality of a power supply through an alarm unit when the temperature detected by the temperature sensor exceeds the threshold value.

* * * * *